United States Patent
Jafari Tafti et al.

(10) Patent No.: US 10,427,676 B2
(45) Date of Patent: Oct. 1, 2019

(54) TRAJECTORY PLANNER FOR AUTONOMOUS DRIVING USING BÉZIER CURVES

(71) Applicant: GM GLOBAL TECHNOLOGY OPERATIONS LLC, Detroit, MI (US)

(72) Inventors: Sayyed Rouhollah Jafari Tafti, Troy, MI (US); Syed B. Mehdi, Farmington Hills, MI (US); Praveen Palanisamy, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 15/609,344

(22) Filed: May 31, 2017

(65) Prior Publication Data

US 2018/0348767 A1   Dec. 6, 2018

(51) Int. Cl.
*G05D 1/02*   (2006.01)
*B60W 30/095*   (2012.01)
*G08G 1/16*   (2006.01)

(52) U.S. Cl.
CPC .... *B60W 30/0953* (2013.01); *B60W 30/0956* (2013.01); *G05D 1/0217* (2013.01); *B60W 2520/06* (2013.01); *B60W 2520/105* (2013.01); *B60W 2550/302* (2013.01); *B60W 2550/306* (2013.01); *B60W 2550/408* (2013.01); *B60W 2750/40* (2013.01); *G05D 2201/0213* (2013.01); *G08G 1/161* (2013.01)

(58) Field of Classification Search
CPC .................................................. G05D 1/0214
See application file for complete search history.

(56) References Cited

U.S. PATENT DOCUMENTS

| | | | | |
|---|---|---|---|---|
| 9,821,801 | B2* | 11/2017 | Di Cairano | B60W 30/09 |
| 10,216,193 | B2* | 2/2019 | Gupta | G05D 1/0234 |
| 2016/0375901 | A1* | 12/2016 | Di Cairano | B60W 30/09 701/26 |
| 2017/0066450 | A1* | 3/2017 | Ko | B60W 50/0098 |
| 2018/0059670 | A1* | 3/2018 | Nilsson | B60W 30/09 |

* cited by examiner

*Primary Examiner* — Hussein Elchanti
*Assistant Examiner* — Michael A Berns
(74) *Attorney, Agent, or Firm* — Quinn IP Law

(57) ABSTRACT

Systems and methods are provided for controlling a vehicle. In one embodiment, a method includes receiving vehicle state data, high-definition map data, and vehicle object environment data, generating a trajectory path that is optimal with respect to the received data, determining whether to update the trajectory path using Bézier curves based on the received data, performing an assessment of the trajectory using properties of Bézier curves, and generating an updated trajectory.

17 Claims, 10 Drawing Sheets

TRAJECTORY PLANNER FOR AUTONOMOUS DRIVING USING BÉZIER CURVES

INTRODUCTION

The present invention generally relates to autonomous vehicles, and more particularly relates to systems and methods for trajectory planning in an autonomous vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Accordingly, it is desirable to provide systems and methods that perform efficient trajectory planning for various automated driver-assistance systems. It is further desirable to provide methods and systems for trajectory planning that improves the computational efficiency of trajectory planning using a combination of graph-based and Bézier curve methods. Furthermore, other desirable features and characteristics of the systems and methods will become apparent from the subsequent detailed description and the appended claims, taken in conjunction with the accompanying drawings and the foregoing technical field and background.

SUMMARY

Embodiments according to the present disclosure provide a number of advantages. For example, embodiments according to the present disclosure enable computationally-efficient revision to a generated trajectory path for a vehicle using graph search and Bézier curve methods.

In one aspect, a processor-implemented method for automated driving of a vehicle includes the steps of receiving, by one or more data processors, vehicle state data, map data, and vehicle object environment data, generating, by the one or more data processors, a first trajectory path that is optimal with respect to the vehicle state data, the map data, and the vehicle object environment data, determining, by the one or more data processors, whether to update the first trajectory path based on the vehicle state data and the vehicle object environment data, generating, by the one or more data processors, an updated trajectory path based on the vehicle state data and the vehicle object environment data. The updated trajectory path includes changes to one or more of a speed profile and a spatial path of the first trajectory path and the updated trajectory path is provided to a controller in the vehicle for implementing the driving scenario plan.

In some aspects, the vehicle object environment data includes data related to other vehicles in the vicinity of the first trajectory path.

In some aspects, the received vehicle state data, map data, and vehicle object environment data are provided by one of the following modules: a sensor fusion module for listing detected remote road users and obstacles on the road; a map module which includes details about a road network and traffic flow restrictions; and a vehicle state module for determining a current state of the vehicle.

In some aspects, the current state of the vehicle includes one or more of a vehicle position, a vehicle heading, a vehicle velocity, and a vehicle acceleration.

In some aspects, generating an updated trajectory path based on the vehicle state data and the vehicle object environment data includes performing a trajectory assessment using properties of Bézier curves.

In some aspects, the method further includes reviewing and checking the updated trajectory path for possible collisions with other vehicles detected in the vicinity of the updated trajectory path based on the vehicle object environment data.

In some aspects, reviewing and checking the updated trajectory includes assessing the updated trajectory with a projected trajectory of a target vehicle using Bézier curves.

In another aspect, an autonomous vehicle includes at least one sensor that provides sensor data about objects within the vehicle's environment and about a vehicle state and a controller that, by a processor and based on the sensor data, is configured to generate a first trajectory path that is optimal with respect to the received sensor data, determine whether to update the first trajectory path based on the sensor data, and generate an updated trajectory path based on the sensor data. The updated trajectory path includes changes to one or more of a speed profile and a spatial path of the first trajectory path and the updated trajectory path is provided to a controller in the vehicle for implementing the driving scenario plan.

In some aspects, the vehicle object environment data includes data related to other vehicles in the vicinity of the first trajectory path.

In some aspects, the vehicle state data includes one or more of a vehicle position, a vehicle heading, a vehicle velocity, and a vehicle acceleration.

In some aspects, generating an updated trajectory path based on the sensor data includes performing a trajectory assessment using properties of Bézier curves.

In some aspects, the controller is further configured to review and check the updated trajectory path for possible collisions with other vehicles detected in the vicinity of the updated trajectory path based on the vehicle environment data.

In some aspects, reviewing and checking the updated trajectory includes assessing the updated trajectory with a projected trajectory of a target vehicle using Bézier curves.

In yet another aspect, a system for automated driving of a vehicle includes a data communication pathway for transmitting vehicle state data, map data, and vehicle object environment data and one or more data processors configured to generate a first trajectory path that is optimal with respect to the received vehicle state data, map data, and vehicle object environment data, determine whether to update the first trajectory path based on the vehicle state data and the vehicle object environment data, and generate an updated trajectory path based on the vehicle state data and the vehicle object environment data. The updated trajectory path includes changes to one or more of a speed profile and a spatial path of the first trajectory path and the updated trajectory path is provided to a controller in the vehicle for implementing the driving scenario plan.

In some aspects, the vehicle object environment data includes one or more of position and velocity data related to other vehicles in the vicinity of the first trajectory path.

In some aspects, the vehicle state data includes one or more of a vehicle position, a vehicle heading, a vehicle velocity, and a vehicle acceleration.

In some aspects, the map data includes one or more of road network details and traffic flow restrictions.

In some aspects, generating an updated trajectory path based on the sensor data includes performing a trajectory assessment using properties of Bézier curves.

In some aspects, the one or more data processors are further configured to review and check the updated trajectory path for possible collisions with other vehicles detected in the vicinity of the updated trajectory path based on the vehicle object environment data.

In some aspects, reviewing and checking the updated trajectory includes assessing the updated trajectory with a projected trajectory of a target vehicle using Bézier curves.

BRIEF DESCRIPTION OF THE DRAWINGS

The present disclosure will be described in conjunction with the following figures, wherein like numerals denote like elements.

Figure 1:
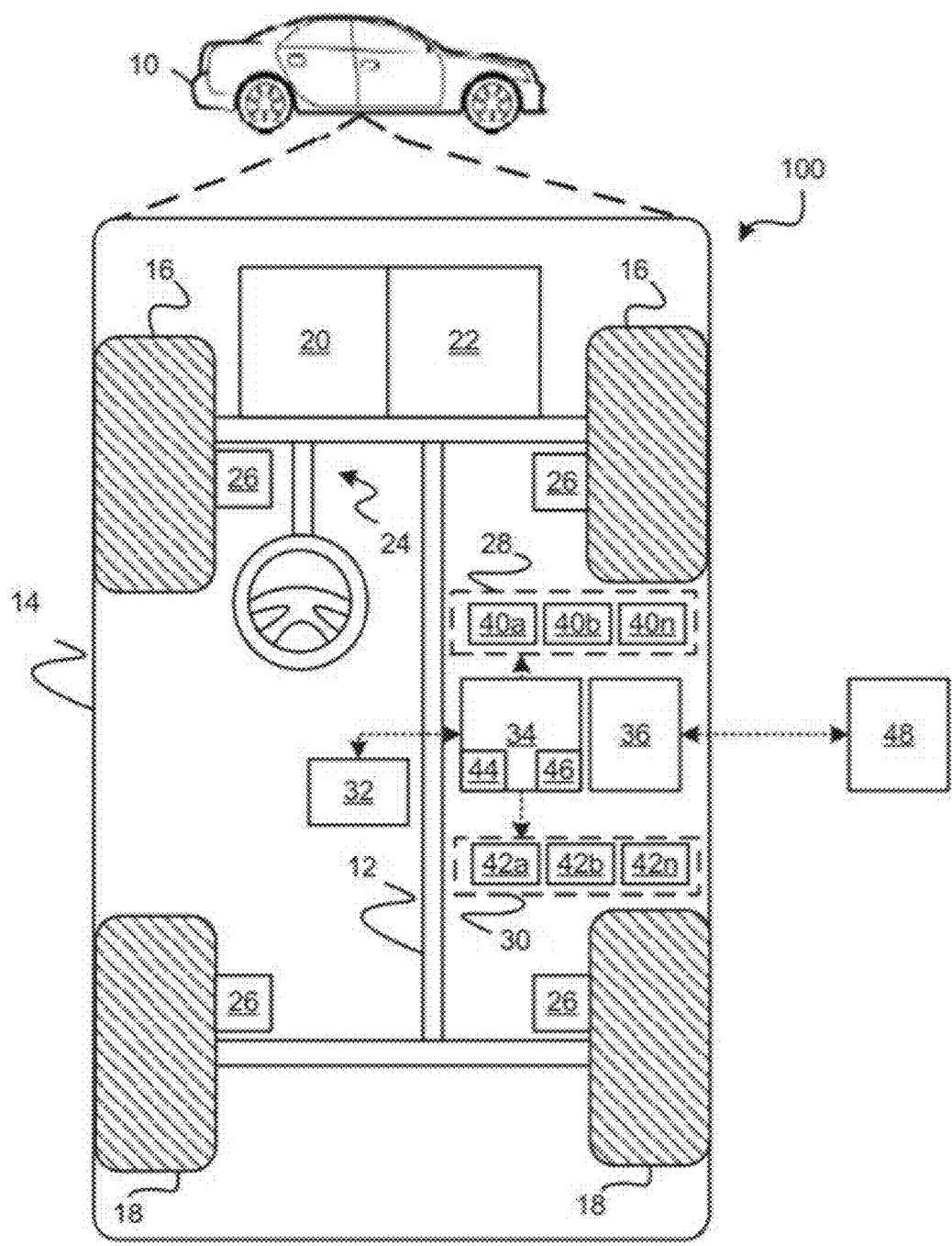
FIG. 1 is a block diagram illustrating an autonomous vehicle having a trajectory planning system, in accordance with various embodiments.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right" "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

With reference to FIG. 1, a trajectory planning system shown generally at 100 is associated with a vehicle 10 in accordance with various embodiments. In general, system 100 determines a trajectory plan for automated driving.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the trajectory planning system 100 and, when executed by the processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

Figure 2:
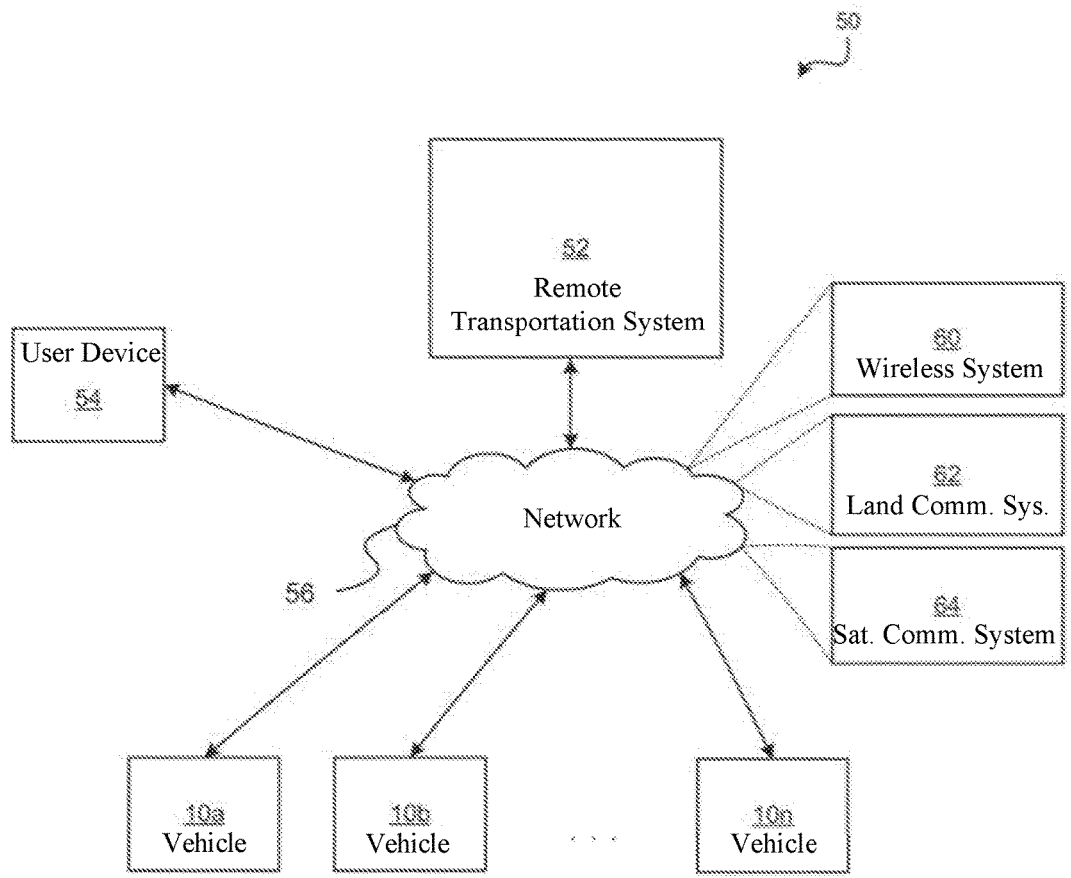
FIG. 2 is a block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
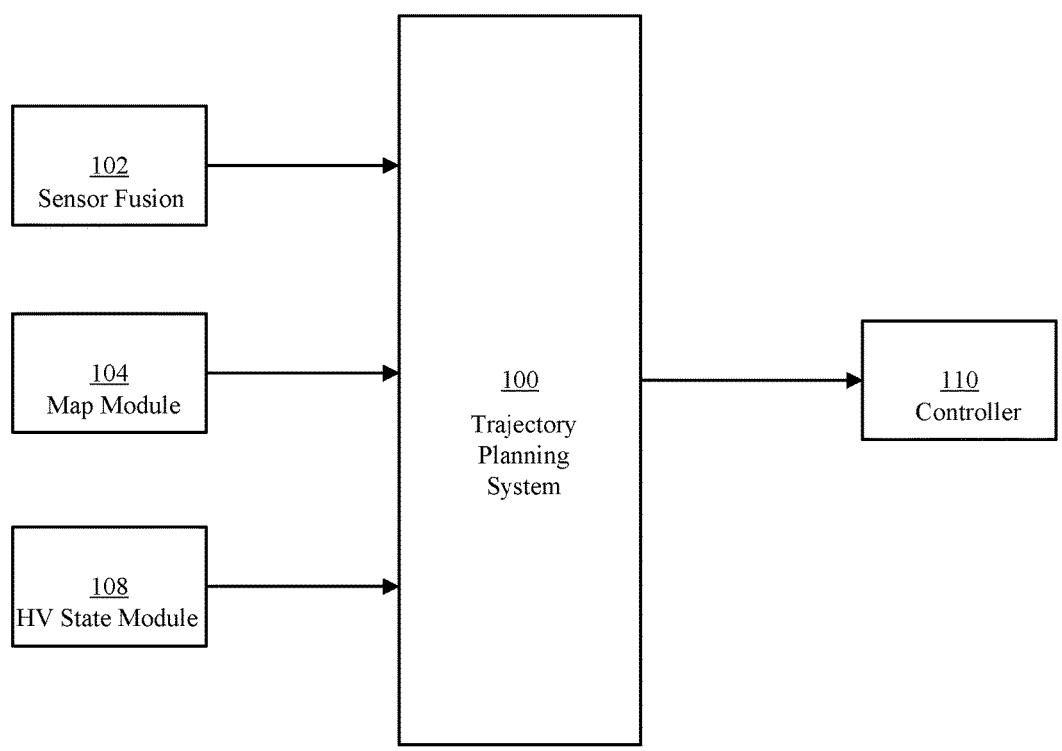
FIG. 3 is a dataflow diagram illustrating a trajectory planning system of the autonomous vehicle, in accordance with various embodiments.

With reference to FIG. 3, and with continued reference to FIG. 1, a dataflow diagram illustrates various embodiments of the trajectory planning system 100 which may be embedded within the controller 34. Various embodiments of the trajectory planning system 100 according to the present disclosure can include any number of sub-modules embedded within the controller 34. As can be appreciated, the sub-modules shown in FIG. 3 can be combined and/or further partitioned to similarly perform trajectory planning. Inputs to the trajectory planning system 100 may be received from the sensor system 28, received from other control modules (not shown) associated with the autonomous vehicle 10, received from the communication system 36, and/or determined/modeled by other sub-modules (not shown) within the controller 34.

In various embodiments, the controller 34 includes a trajectory planning system 100 that receives host vehicle data, road geometry, map attributes, high-level behavioral guidance, and remote objects as inputs and generates a collision-free and feasible trajectory for the vehicle to follow in the near future. More specifically, the trajectory planner 100 receives sensor fusion data from the sensor fusion module 102. Fusion refers to the process of fusing data from one or more sensors to provide a holistic view of the objects in the environment. The sensor fusion data from the sensor fusion module 102 includes a list of objects within the environment, such as remote road users and obstacles on the road and is a complete representation of the surrounding environment, including lane data and a list of all stationary and dynamic objects in the vicinity of the host vehicle, including, for example and without limitation, position, velocity, and/or acceleration data of vehicles in the vicinity of the host vehicle.

HD map module 104 provides as input to the trajectory planning system 100 geometric and dynamic constraints of the road using a high definition map. The high definition map data includes details about the road network, traffic flow restrictions, and other map attributes, for example and without limitation. Additionally, host vehicle (HV) state module 108 provides position and kinematic constraints for the current state of the host vehicle, including vehicle position, heading, velocity, and acceleration, for example and without limitation. Use of such input data ensures that the trajectory planner 100 is provided with a comprehensive understanding of the current scenario.

The trajectory planning system 100 processes the inputs in order to generate a trajectory output that in one embodiment satisfies the kinematic and dynamic constraints of the host vehicle as well as the free-space and road boundary constraints of the environment. The generated trajectory includes a list of path waypoints along with a velocity profile for use by the longitudinal and lateral controller 110 in autonomous driving. The trajectory planning system 100, using a graph-based algorithm is discussed, for example, in related U.S. patent application Ser. No. 15/347,546, filed Nov. 9, 2016, titled "PROCESSOR-IMPLEMENTED SYSTEMS AND METHODS FOR AUTOMATED DRIVING" and is incorporated by reference in its entirety herein. The trajectory planning system 100 is used at specific planning intervals to generate a safe and feasible trajectory that satisfies the known constraints.

Figure 4:
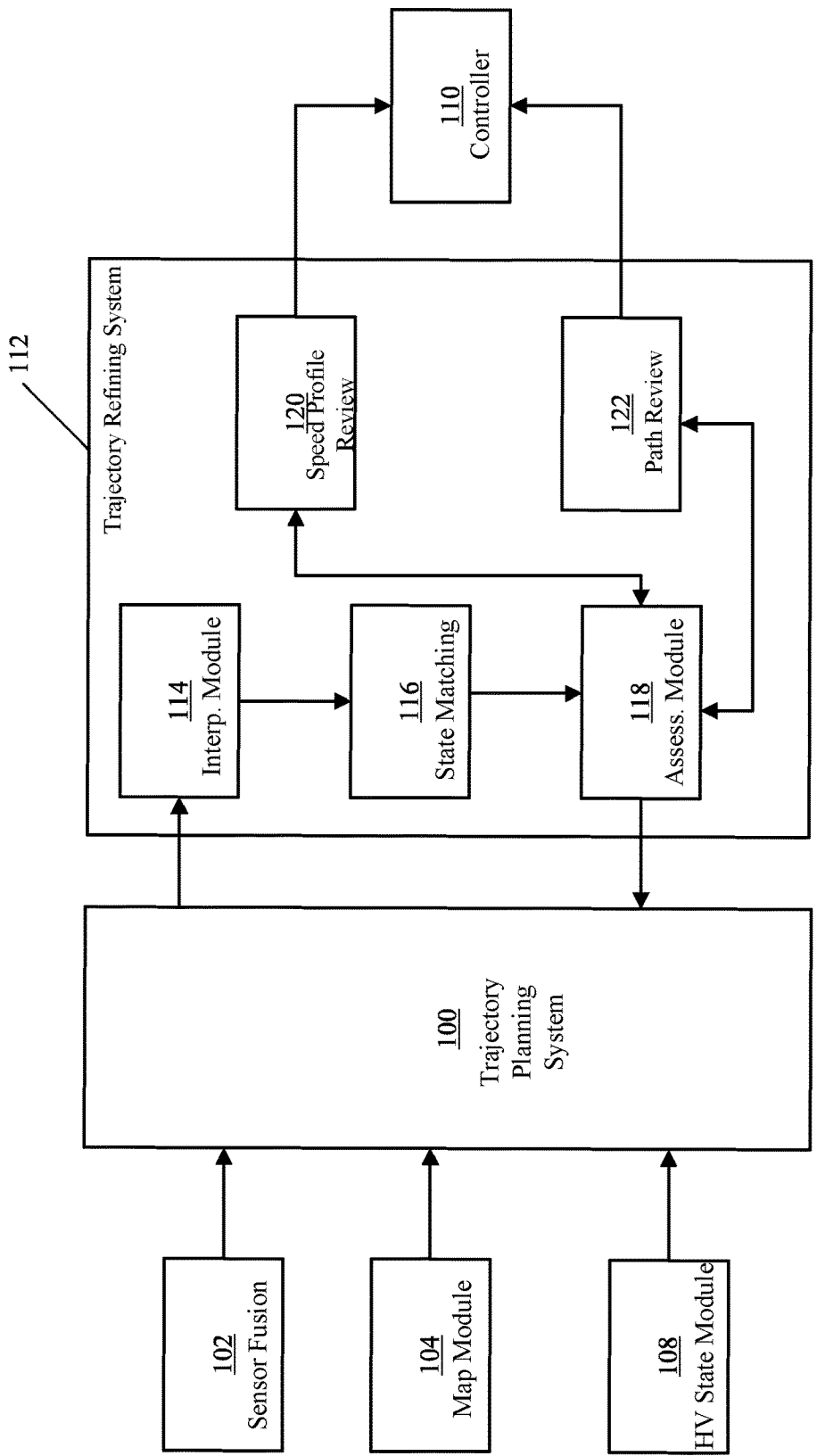
FIG. 4 is a dataflow diagram illustrating a trajectory planning and refining system of the autonomous vehicle, in accordance with various embodiments.

In between planning intervals and when there are no collision threats from remote vehicles, the generated trajectory is efficiently revised using Bézier curves, as illustrated in FIG. 4. FIG. 4 illustrates components of a trajectory refining system 112 which may be embedded within the controller 34. Various embodiments of the trajectory refining system 112 according to the present disclosure can include any number of sub-modules embedded within the controller 34. As can be appreciated, the sub-modules shown in FIG. 4 can be combined and/or further partitioned to similarly perform revisions to previously-generated trajectories. Inputs to the trajectory refining system 112 may be received from the trajectory planning system 100, the sensor system 28, other control modules (not shown) associated with the autonomous vehicle 10, the communication system 36, and/or determined/modeled by other sub-modules (not shown) within the controller 34.

The trajectory refining system 112 revises the trajectory previously generated by the trajectory planning system 100. Interpolation module 114 receives the previously-generated trajectory and smoothly interpolates between the previously-generated trajectory waypoints using Bézier curves to generate an interpolated trajectory. An updated spatial path is developed by interpolating waypoints using piecewise Bézier curves. An updated temporal profile is developed by interpolating the speed at discrete time intervals using piecewise Bézier curves. Composing the spatial path by the temporal profile results in an updated trajectory that passes through the waypoints while maintaining the desired speed profile. Vehicle state matching module 116 uses the interpolated trajectory to update the generated trajectory to match the current vehicle state including the vehicle's position, speed, heading angle, and acceleration, for example and without limitation.

Threat assessment module 118 reviews and checks the updated trajectory for possible collisions with obstacles and/or vehicles. Checking the updated trajectory includes reviewing sensor data received from the sensor fusion module 102 for possible collisions with detected obstacles and/or vehicles. Speed profile review module 120 reviews the updated trajectory and changes the speed profile of the updated trajectory, if necessary, without altering the spatial path of the updated trajectory. Spatial path review module 122 reviews the updated trajectory and updates both the spatial path and the temporal profile to avoid a possible collision with surrounding objects. For example, the module 122 can generate a lane change trajectory, if needed. The updated trajectories generated by modules 120, 122 are also reviewed and checked by the threat assessment module 118 for possible collisions with obstacles and/or vehicles.

The updated trajectory, after having been reviewed and checked by the threat assessment module 118, is provided to the longitudinal and lateral controller 110 of the vehicle for tracking the planned trajectory. As a result of the input and processing depicted in FIG. 4, the updated trajectory output satisfies the kinematic and dynamic constraints of the host vehicle and free-space and road boundary constraints of the environment while matching the current vehicle state. The generation and refinement of the updated trajectory paths by the trajectory revision planner 112 are further described through the visual examples of FIGS. 5A-9B and in further reference to FIG. 4.

Figures 5A, 5B:
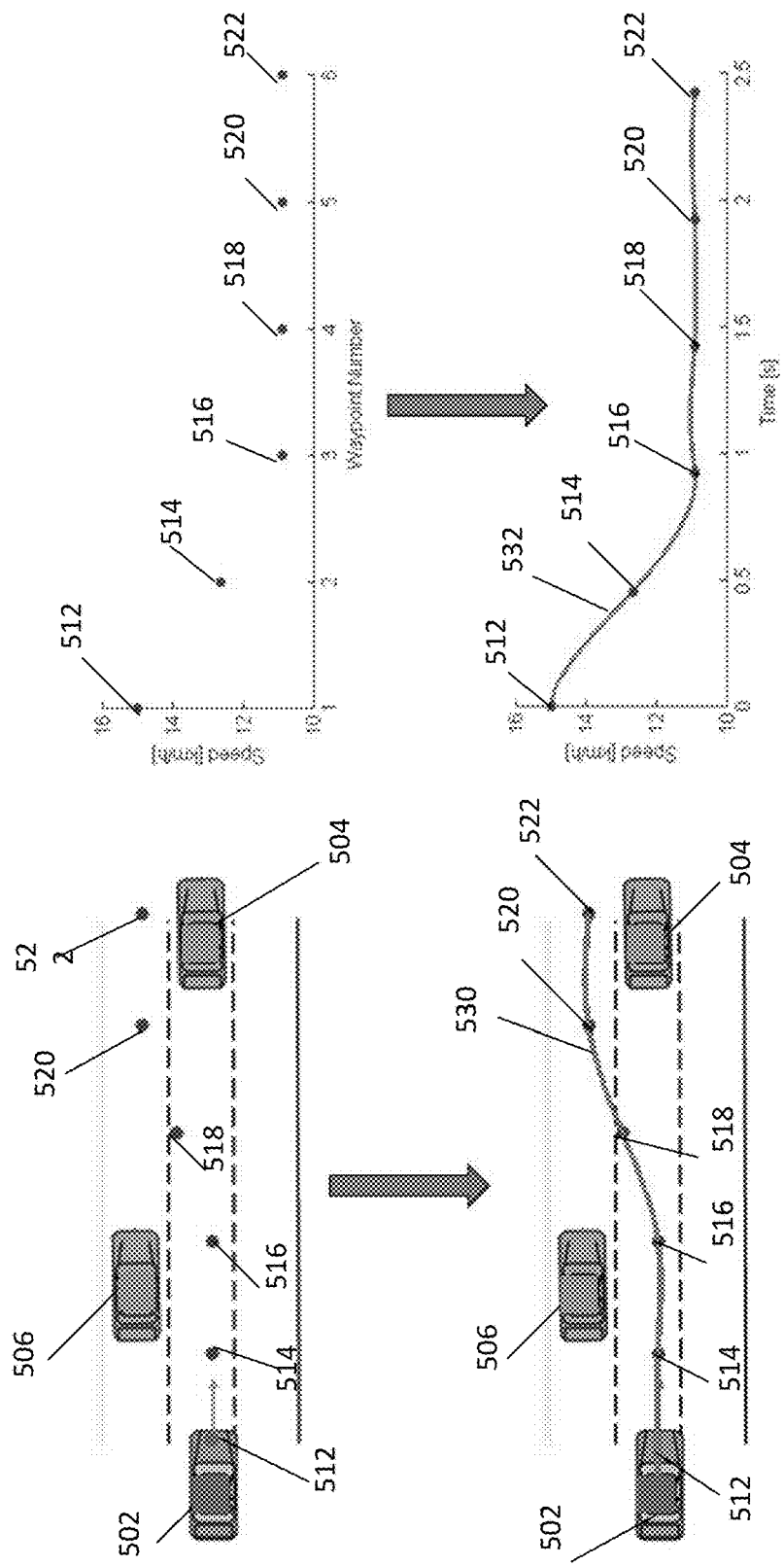
FIG. 5A is a topographical diagram illustrating a spatial interpolation of a trajectory refining system, in accordance with various embodiments.
FIG. 5B is a graphical diagram illustrating a temporal interpolation of a trajectory refining system, in accordance with various embodiments.

FIG. 5A depicts a topographical view of several vehicles including a host vehicle 502 and several target vehicles 504, 506. Host vehicle 502 is traveling in the center lane while the target vehicles 504, 506 are traveling in the center and left lanes as indicated. The obstacle environment is described through the data provided by the sensor fusion module 102, the HD map module 104, and the host vehicle state module 108 of FIG. 4.

A plurality of waypoints 512, 514, 516, 518, 520, 522 are generated by the trajectory planning system 100. The trajectory refining system 112 interpolates between the waypoints to generate a spatial path 530. The spatial path 530 is developed by interpolating waypoints using piecewise Bézier curves, as shown in FIG. 5A. A temporal profile 532, as shown in FIG. 5B, is developed by the trajectory refining system 112 by interpolating the vehicle speed at the generated waypoints using piecewise Bézier curves. As shown in FIG. 5B, the vehicle velocity at waypoints further along the projected path (e.g., waypoints 516, 518, 520, 522) is slower than the velocity at waypoints closer to the beginning of the projected path (e.g., waypoints 512, 514) in order to avoid target vehicle 504. The revised trajectory is generated by composing the spatial path with the temporal profile to obtain a trajectory that passes through the generated waypoints while maintaining the desired vehicle speed profile.

Figure 6:
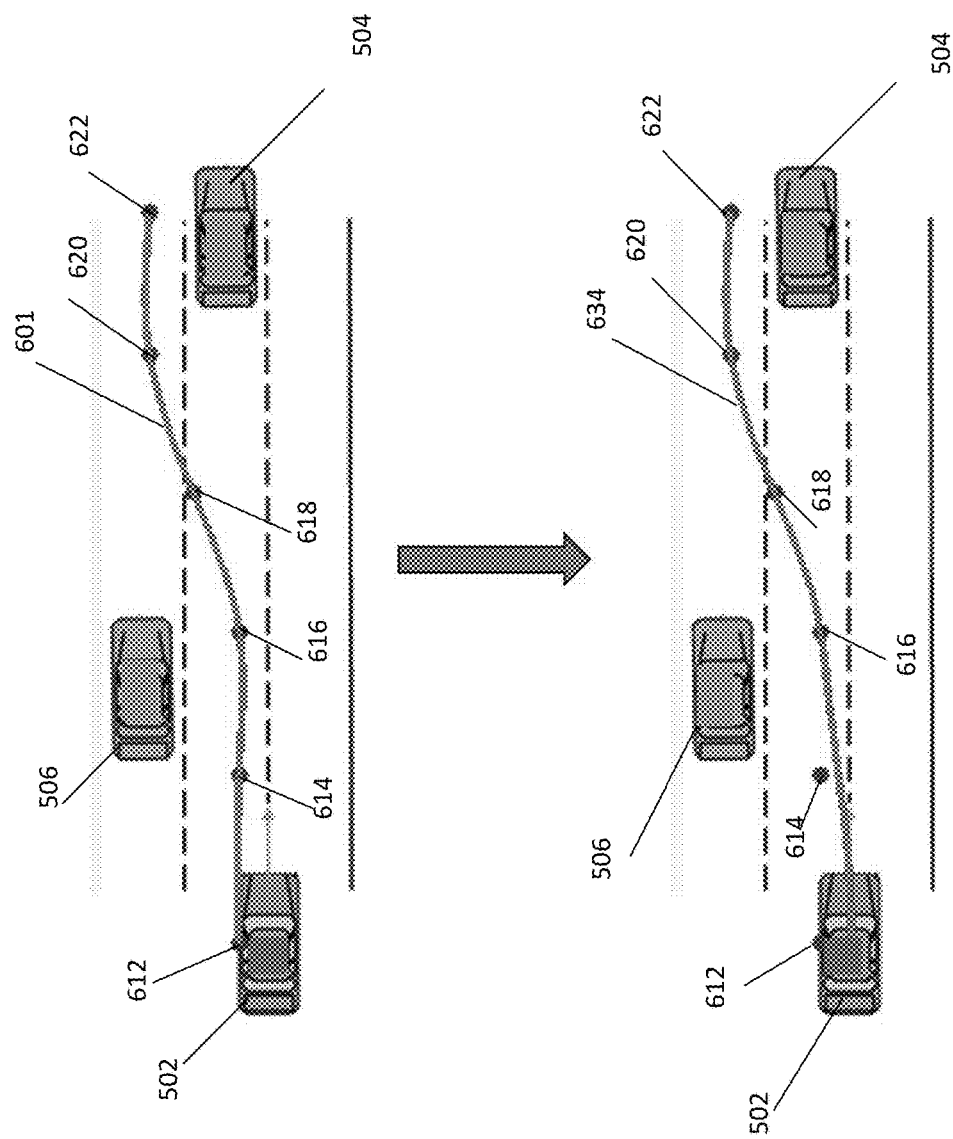
FIG. 6 is a topographical diagram illustrating an initial trajectory and a refined trajectory generated from a series of waypoints, in accordance with various embodiments.

FIG. 6 illustrates vehicle state matching, including spatial and temporal updates, performed by the trajectory refining system 112. A topographical view of an initial trajectory 601 and a refined or updated trajectory 634 for the host vehicle 502 are shown in FIG. 6. The initial trajectory 601, including waypoints 612, 614, 616, 618, 620, 622, is generated by the trajectory planning system 100 according to the methods discussed above and in the above-referenced U.S. patent application Ser. No. 15/347,546. As shown in the upper image of FIG. 6, the initial trajectory 601 connects the waypoints 612, 614, 616, 618, 620, 622. The initial trajectory 601 is updated such that the initial state of the updated trajectory 634 matches the current vehicle state and the updated trajectory 634 returns to the previously-generated trajectory after a short period of time.

Figures 7A, 7B:
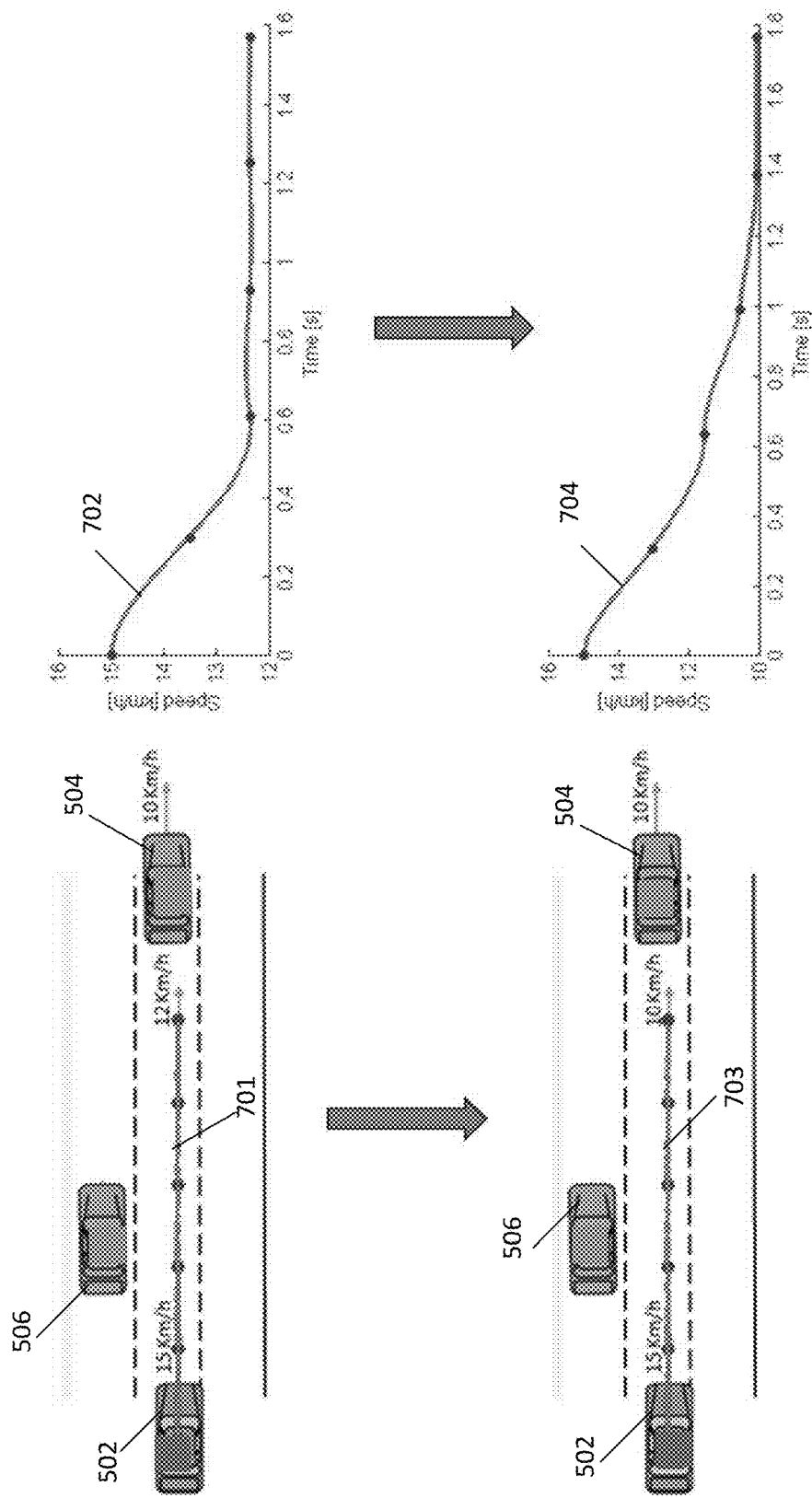
FIG. 7A is a topographical diagram illustrating a refined trajectory where the spatial path remains the same as the initial trajectory, in accordance with various embodiments.
FIG. 7B is a graphical diagram illustrating a refined trajectory with an updated speed profile, in accordance with various embodiments.

FIGS. 7A and 7B illustrate speed profile and temporal updates to a generated trajectory. A topographical view of the initial trajectory 701 indicates that the speed of the host vehicle 502 decreases from approximately 15 km/h to approximately 12 km/h as the host vehicle 502 approaches the target vehicle 504. However, to avoid a possible collision, such as when the target vehicle 504 slows down, the trajectory refining system 112 updates the trajectory by changing the speed profile only (that is, by changing the temporal Bézier curve) while maintaining the same spatial path. The trajectory refining system 112 generates a revised or updated trajectory that has the spatial path as shown in FIG. 7A and has an updated speed profile 704 to account for the slower speed of the target vehicle 504, as shown in FIG. 7B. The revised or updated trajectory (composed of the spatial path 703 shown in FIG. 7A and the updated speed profile 704 shown in FIG. 7B) is provided to the longitudinal and lateral controller 110 for use in driving the host vehicle 502.

Figures 8A, 8B:
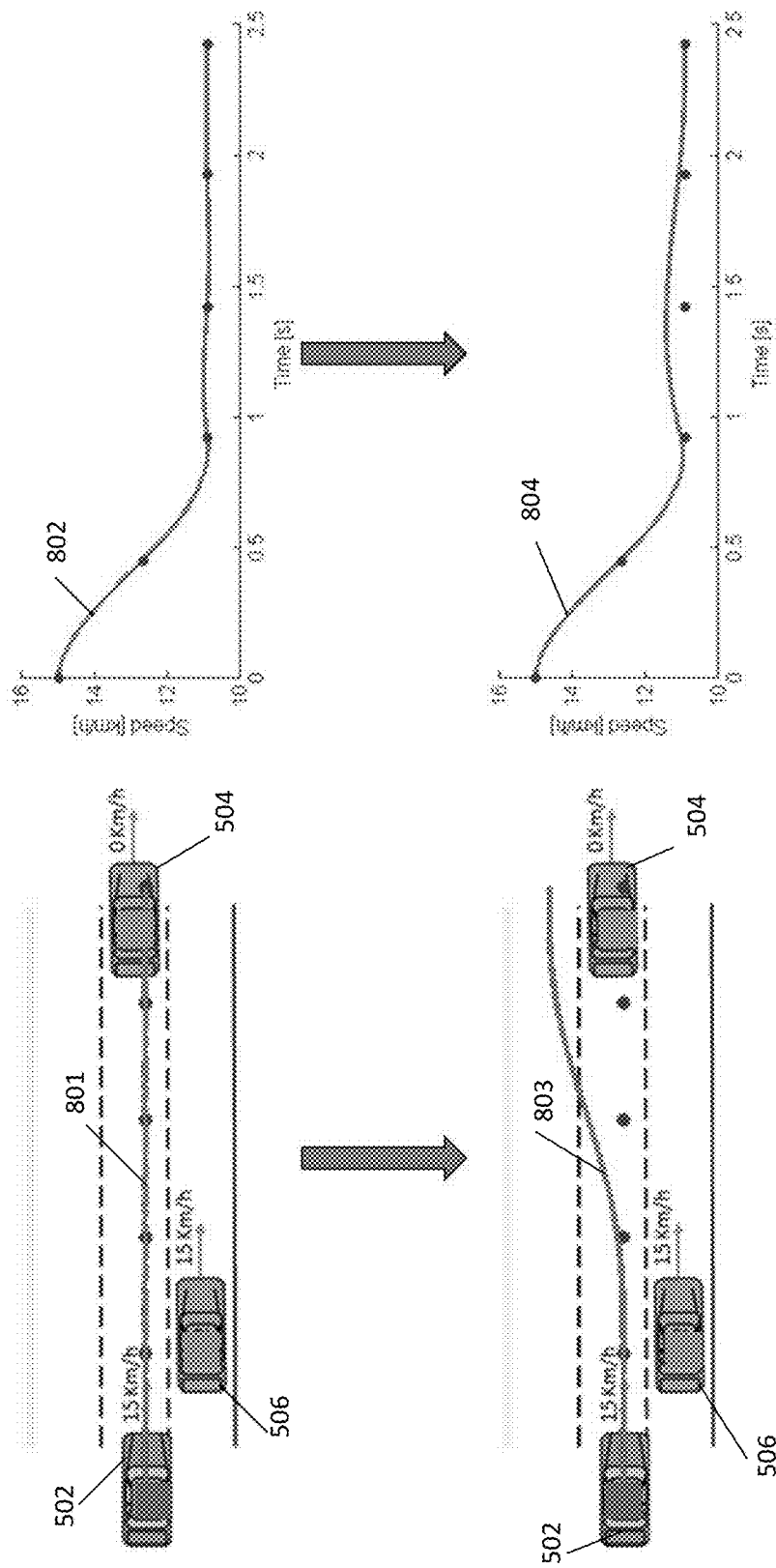
FIG. 8A is a topographical diagram illustrating a refined trajectory with an update to the spatial path, in accordance with various embodiments.
FIG. 8B is a graphical diagram illustrating a refined trajectory with an update to the speed profile, in accordance with various embodiments.

If a feasible path is not obtained by changing the speed profile of the revised trajectory, the trajectory refining system 112 replans the trajectory as shown, for example, in FIGS. 8A and B. As shown in the example depicted in FIG. 8A, the host vehicle 502 is traveling at a velocity of 15 km/h and approaching the target vehicle 504 traveling at 0 km/h. To avoid a possible collision with the target vehicle 504, and taking into account the position of the target vehicle 506, the trajectory refining system 112 replans the trajectory by deviating from the predetermined waypoints to generate the revised or updated trajectory composed of the updated spatial path 803 and the updated speed profile 804. The updated trajectory is provided to the longitudinal and lateral controller 110 for use in driving the host vehicle 502. The original trajectory 801 connects the waypoints directing the vehicle 502 to travel along the center lane of the roadway. However, to avoid both of the target vehicles 504, 506, the trajectory refining system 112 updates the trajectory such that the updated trajectory avoids both of the target vehicles 504, 506 by adding a lane change curve at the appropriate time, consequently changing both the spatial path and the speed profile of the original trajectory. As shown in FIG. 8B, the temporal profile 802 of the initially generated trajectory is revised by the trajectory refining system 112 to the revised temporal profile 804 to account for the slower speed of the target vehicle 504 and the location of the target vehicle 506. The revised or updated trajectory is provided to the longitudinal and lateral controller 110 for use in driving the host vehicle 502.

Figure 9B:
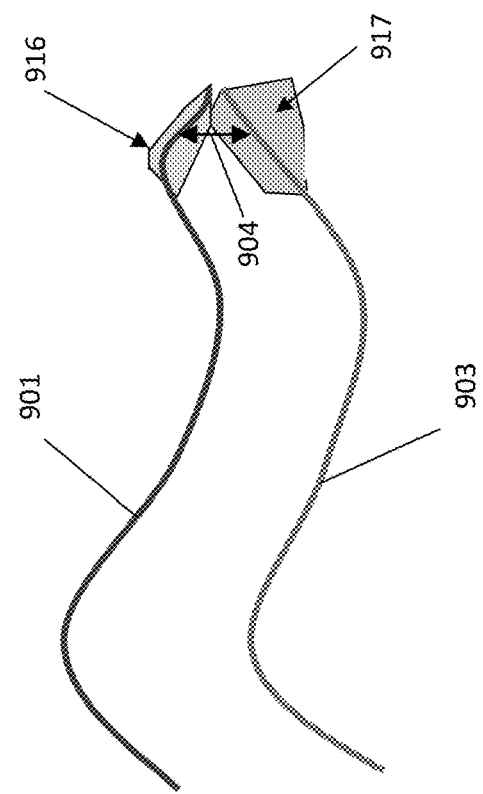
FIG. 9B is a graphical representation of a host vehicle trajectory and a remote vehicle predicted trajectory having a second spacing distance, in accordance with various embodiments.
Figure 9A:
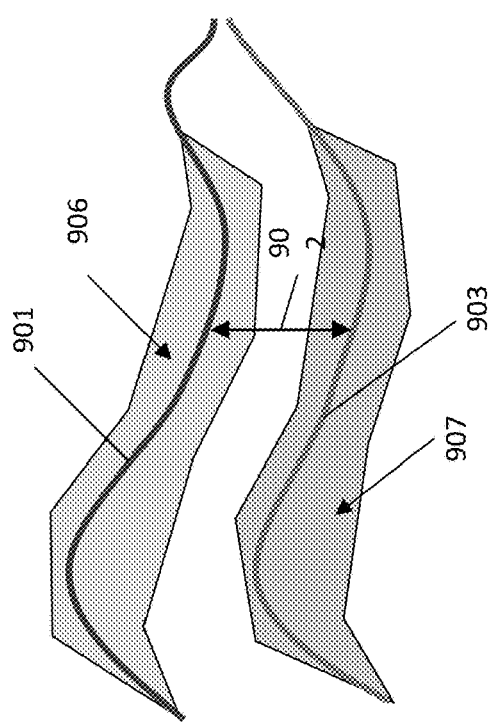
FIG. 9A is a graphical representation of a host vehicle trajectory and a remote vehicle predicted trajectory having a first spacing distance, in accordance with various embodiments.

FIGS. 9A and B illustrate the concept behind using Bézier curves to assess potential threats from other dynamic objects on the road. Bézier curves are widely used to model smooth curves. The curve is completely contained in the convex hull of its control points. Given two trajectories, for example, a host vehicle desired trajectory and a remote vehicle predicted trajectory, represented as Bézier curves, the trajectory refining system 112 performs the following steps to efficiently assess potential collision threats without using discretization. In some embodiments, the assessment of potential collision threats is performed by the threat assessment module 118 of the trajectory refining system 112.

First, the threat assessment module 118 determines whether the trajectories come too close together, as defined by a predetermined spacing interval, at any time instant and calculates the time at which the trajectories are too close, that is, within the predetermined spacing interval. As shown in FIGS. 9A and B, a host vehicle trajectory 901 and a target vehicle projected trajectory 903 are separated by a first spacing interval 902 at one time while at a second, and, in this example, later, time the trajectories 901, 903 are separated by a second spacing interval 904. In the example illustrated in FIGS. 9A and B, the second spacing interval 904 is smaller than the first spacing interval 902; however, in other examples, the first spacing interval may be smaller than the second spacing interval. Large segments of the Bézier curve trajectories can be over-approximated using convex hulls 906, 907. If the distance between the convex hulls 906, 907 is large enough, the corresponding segments of the curves can be discarded without further calculation or refinement to the host vehicle trajectory. However, if the distance between the convex hulls, such as the hulls 916, 917, is not large enough, the convex hull segments can be made smaller and the comparison of the distance between the convex hulls is repeated. As shown in FIG. 9B, the distance between segments of the curves covered by the polygonal convex hulls needs to be checked after more refinement. If the distance between the convex hulls is not large enough, the threat assessment module 118 provides data to one or more of the vehicle state matching module 116, the speed profile review module 120, and the spatial path review module 122 to refine the host vehicle trajectory such that, when assessed again by the threat assessment module 118, the Bézier curve trajectories are separated by at least the predetermined spacing interval. The predetermined spacing interval is defined, for example and without limitation, to avoid possible collisions between the host vehicle and the target vehicle, among other factors.

Figure 10:
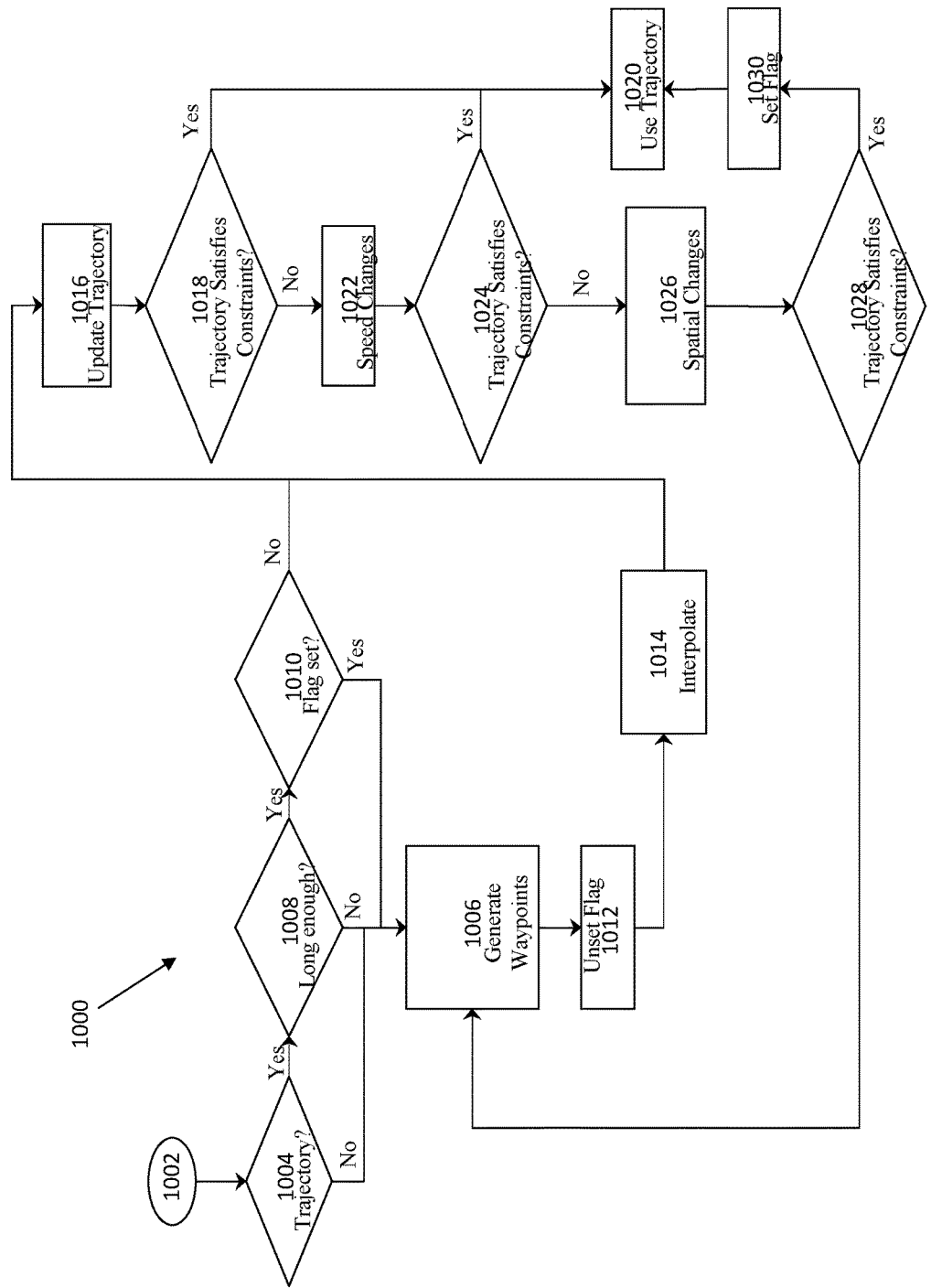
FIG. 10 is a flowchart illustrating an operational scenario for controlling the autonomous host vehicle, in accordance with various embodiments.

FIG. 10 depicts a flowchart of a method or algorithm 1000 used for trajectory planning. The method 1000 can be utilized in connection with the vehicle 10, which may be an autonomous or semi-autonomous vehicle, or may be any vehicle equipped with one or more sensing devices 40a-40n. The method 1000 can be utilized in connection with the controllers 34, 110 and the various modules of the trajectory planning system 100 and the trajectory refining system 112, in accordance with exemplary embodiments. The order of operation of the method 1000 is not limited to the sequential execution as illustrated in FIG. 10 but may be performed in one or more varying orders, or steps may be performed simultaneously, as applicable and in accordance with the present disclosure.

As shown in FIG. 10, starting at 1002, the method 1000 proceeds to 1004. At decision block 1004, the controller determines whether a trajectory is available. If a trajectory is not available, then process block 1006 generates trajectory waypoints using the graph-based approach discussed, for example, in U.S. patent application Ser. No. 15/347,546. If a trajectory is available, then, at decision block 1008, the controller determines whether the trajectory is long enough, i.e. longer than a configurable, pre-defined length. If the trajectory is not long enough, then, at process block 1006, the controller generates trajectory waypoints as discussed above. If the trajectory is determined to be long enough, then, at decision block 1010, the controller determines whether a 'graph search flag' is set. A graph search flag is set to trigger the generation of a trajectory using the graph-based approach discussed, for example, in U.S. patent application Ser. No. 15/347,546.

If the 'graph search flag' is set, then, at process block 1006, the controller generates trajectory waypoints as discussed above. From process block 1006, at process block 1012 the controller unsets the 'graph search flag' and the method 1000 proceeds to process block 1014. The graph search flag is unset once valid trajectory waypoints are generated using the graph-based approach. At process block 1014, the controller interpolates between waypoints using piecewise Bézier curves. The method 1000 proceeds to block 1016.

If the 'graph search flag' is not set, the method 1000 proceeds to block 1016. At process block 1016, the controller, including the vehicle state matching module 116 of the trajectory refining system 112, updates the trajectory to match the current vehicle state. Next, decision block 1018 determines whether the updated trajectory satisfies dynamic constraints such as maximum lateral acceleration/jerk and environmental constraints such as obstacles and road boundaries as well as ensuring the trajectory avoid collisions based on the assessment performed by the threat assessment module 118. If the updated trajectory satisfies the dynamic and environmental constraints, the method 1000 proceeds to block 1020. At process block 1020, the updated trajectory is sent to the longitudinal and lateral controller 110 for use in driving the vehicle.

If the updated trajectory does not satisfy the dynamic and environmental constraints, the method 1000 proceeds to block 1022. At process block 1022, the speed profile review module 120 of the trajectory refining system 112 changes the speed profile of the updated trajectory to satisfy any environmental constraints. From block 1022, the method 1000 proceeds to decision block 1024. At the decision block 1024, similar to the analysis performed at decision block 1018, the controller determines whether the updated trajectory with the updated speed profile satisfies dynamic constraints such as maximum lateral acceleration/jerk and environmental constraints such as obstacles and road boundaries. If the updated trajectory with the updated speed profile satisfies the dynamic and environmental constraints, the method 1000 proceeds to block 1020. At process block 1020, the updated trajectory with the updated speed profile is sent to the longitudinal and lateral controller 110 for use in driving the vehicle.

If the updated trajectory with the updated speed profile does not satisfy the dynamic and environmental constraints, the method 1000 proceeds to block 1026. At process block 1026, the spatial path review module 122 of the trajectory refining system 112 makes spatial changes to the updated trajectory including, for example and without limitation, revising the trajectory to include an appropriately-timed lane change. At decision block 1028, if the updated trajectory with an updated speed profile, spatial, and/or temporal changes satisfies the dynamic and environmental constraints, the method 1000 proceeds to block 1030. At process block 1030, the controller sets the 'graph search flag'. As discussed above, the graph search flag triggers generation of a trajectory using the graph-based approach discussed, for example, in U.S. patent application Ser. No. 15/347,546. Next, the method 1000 process to block 1020. At process block 1020, the updated trajectory with the updated speed profile, spatial, and/or temporal changes is sent to the longitudinal and lateral controller 110 for use in driving the vehicle.

If the updated trajectory with the updated speed profile and spatial updates does not satisfy the dynamic and environmental constraints, the method 1000 returns to process block 1006 and the controller generates new trajectory waypoints using a graph-based approach, as discussed above.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way, required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise.

Thus, for example, reference to an item includes reference to one or more items. The term "ones" refers to one, two, or more, and generally applies to the selection of some or all of a quantity. The term "plurality" refers to two or more of an item. The term "about" or "approximately" means that quantifies, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration; a numerical range of "about 1 to 3" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 3," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A processor-implemented method for automated driving of a vehicle, comprising:
   receiving, by one or more data processors, vehicle state data, map data, and vehicle object environment data;
   generating, by the one or more data processors, a first trajectory path using trajectory waypoints determined via a graph-based approach that is optimal with respect to the vehicle state data, the map data, and the vehicle object environment data;
   generating, by the one or more data processors, an updated trajectory path based on the vehicle state data and the vehicle object environment data, including performing a trajectory assessment using properties of Bézier curves such that the updated trajectory path matches a current vehicle state;
   determining, by the one or more data processors, whether the updated trajectory path satisfies an environmental constraint
   in response to the updated trajectory path not satisfying the environmental constraint, updating a speed profile of the updated trajectory path using properties of Bézier curves;
   determining, by the one or more data processors, whether the updated trajectory path with the updated speed profile satisfies the environmental constraint;
   in response to the updated trajectory path with the updated speed profile not satisfying the environmental constraint, updating a spatial component of the updated trajectory path using properties of Bézier curves;
   determining, by the one or more data processors, whether the updated trajectory path with the updated speed profile and the updated spatial component satisfies the environmental constraint;

in response to the updated trajectory path with the updated speed profile and the updated spatial component not satisfying the environmental constraint, generating a second trajectory path using trajectory waypoints determined via a graph-based approach; and in response to the updated trajectory path with the updated speed profile and the updated spatial component satisfying the environmental constraint, providing the updated trajectory path to a controller of the vehicle for implementing a driving scenario plan.

2. The method of claim 1, wherein the vehicle object environment data includes data related to other vehicles in the vicinity of the first trajectory path.

3. The method of claim 2, further comprising reviewing and checking the updated trajectory path for possible collisions with other vehicles detected in the vicinity of the updated trajectory path based on the vehicle object environment data.

4. The method of claim 3, wherein reviewing and checking the updated trajectory includes assessing the updated trajectory with a projected trajectory of a target vehicle using Bézier curves.

5. The method of claim 1, wherein the received vehicle state data, map data, and vehicle object environment data are provided by one of the following modules: a sensor fusion module for listing detected remote road users and obstacles on the road; a map module which includes details about a road network and traffic flow restrictions; and a vehicle state module for determining a current state of the vehicle.

6. The method of claim 5, wherein the current state of the vehicle includes one or more of a vehicle position, a vehicle heading, a vehicle velocity, and a vehicle acceleration.

7. An autonomous vehicle, comprising:
at least one sensor that provides sensor data about objects within the vehicle's environment and about a vehicle state; and
a controller that, by a processor and based on the sensor data, is configured to
generate a first trajectory path using trajectory waypoints determined via a graph-based approach that is optimal with respect to the received sensor data;
generate an updated trajectory path based on the sensor data by performing a trajectory assessment using properties of Bézier curves;
determine if the updated trajectory path satisfies an environmental constraint;
in response to the updated trajectory path not satisfying the environmental constraint, generate, using properties of Bézier curves, a second updated trajectory path having one or more of a speed profile update and a spatial component update;
verify the second updated trajectory path satisfies the environmental constraint; and
provide the updated trajectory path to a controller of the vehicle for implementing a driving scenario plan.

8. The autonomous vehicle of claim 7, wherein the vehicle object environment data includes data related to other vehicles in the vicinity of the first trajectory path.

9. The autonomous vehicle of claim 7, wherein the vehicle state data includes one or more of a vehicle position, a vehicle heading, a vehicle velocity, and a vehicle acceleration.

10. The autonomous vehicle of claim 7, wherein the controller is further configured to review and check the updated trajectory path for possible collisions with other vehicles detected in the vicinity of the updated trajectory path based on the vehicle environment data.

11. The autonomous vehicle of claim 10, wherein reviewing and checking the updated trajectory includes assessing the updated trajectory with a projected trajectory of a target vehicle using Bézier curves.

12. A system for automated driving of a vehicle, comprising; a data communication pathway for transmitting vehicle state data, map data, and vehicle object environment data; and
one or more data processors configured to generate a first trajectory path using trajectory waypoints determined via a graph-based approach based the received vehicle state data, map data, and vehicle object environment data;
generate an updated trajectory path based on the vehicle state data and the vehicle object environment data by performing a trajectory assessment using properties of Bézier curves, the updated trajectory path including changes to one or more of a speed profile and a spatial path;
determine if the updated trajectory path satisfies an environmental constraint;
in response to the updated trajectory path not satisfying the environmental constraint, generate, using properties of Bezier curves, a second updated trajectory path having one or more of a speed profile update and a spatial component update;
verify the second updated trajectory path satisfies the environmental constraint; and
provide the updated trajectory path to a controller of the vehicle for implementing a driving scenario plan.

13. The system of claim 12, wherein the vehicle object environment data includes one or more of position and velocity data related to other vehicles in the vicinity of the first trajectory path.

14. The system of claim 13, wherein the one or more data processors are further configured to review and check the updated trajectory path for possible collisions with other vehicles detected in the vicinity of the updated trajectory path based on the vehicle object environment data.

15. The system of claim 14, wherein reviewing and checking the updated trajectory includes assessing the updated trajectory with a projected trajectory of a target vehicle using Bézier curves.

16. The system of claim 12, wherein the vehicle state data includes one or more of a vehicle position, a vehicle heading, a vehicle velocity, and a vehicle acceleration.

17. The system of claim 12, wherein the map data includes one or more of road network details and traffic flow restrictions.

* * * * *